United States Patent

Igarashi

(10) Patent No.: US 11,592,313 B2
(45) Date of Patent: Feb. 28, 2023

(54) APPARATUS AND METHOD FOR COLLECTING MAP-GENERATING DATA

(71) Applicant: TOYOTA JIDOSHA KABUSHIKI KAISHA, Toyota (JP)

(72) Inventor: Ryo Igarashi, Chofu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 8 days.

(21) Appl. No.: 17/344,509

(22) Filed: Jun. 10, 2021

(65) Prior Publication Data

US 2021/0389157 A1 Dec. 16, 2021

(30) Foreign Application Priority Data

Jun. 11, 2020 (JP) .............................. JP2020-101544

(51) Int. Cl.
*G01C 21/00* (2006.01)

(52) U.S. Cl.
CPC ..... *G01C 21/3815* (2020.08); *G01C 21/3833* (2020.08)

(58) Field of Classification Search
CPC ............ G01C 21/3815; G01C 21/3833; G01C 21/3837; G01C 21/3841; G01C 21/3848
See application file for complete search history.

(56) References Cited

U.S. PATENT DOCUMENTS

| 2011/0161261 | A1 | 6/2011 | Wu et al. | |
|---|---|---|---|---|
| 2018/0089998 | A1 | 3/2018 | Masuda et al. | |
| 2019/0376809 | A1* | 12/2019 | Hanniel | ............ G01C 21/3841 |
| 2020/0160697 | A1* | 5/2020 | Hayashi | .................. G06F 16/29 |
| 2021/0108943 | A1* | 4/2021 | Liang | ...................... H04L 67/52 |

FOREIGN PATENT DOCUMENTS

| JP | 2007-058370 A | 3/2007 | | |
|---|---|---|---|---|
| JP | 2011-138487 A | 7/2011 | | |
| JP | 2017-117154 A | 6/2017 | | |
| JP | 2018-054343 A | 4/2018 | | |
| JP | 2018-112838 A | 7/2018 | | |
| JP | 2020-046971 A | 3/2020 | | |
| JP | 2020046971 A | * 3/2020 | ............ | G11B 7/241 |

* cited by examiner

*Primary Examiner* — Aaron L Troost
(74) *Attorney, Agent, or Firm* — Oliff PLC

(57) ABSTRACT

An apparatus for collecting map-generating data includes a processor configured to count, for each of road sections, the number of pieces of map-generating data received in a first period from one of at least one vehicle, identify one of the road sections for which the number of pieces of map-generating data received in the first period does not reach a target number for the one of the road sections, and predict, for the identified road section, the number of pieces of map-generating data to be received in a second period ahead after the first period, based on history of traffic volume under each environmental condition or history of the number of pieces of map-generating data previously received for the road section.

4 Claims, 7 Drawing Sheets

APPARATUS AND METHOD FOR COLLECTING MAP-GENERATING DATA

FIELD

The present invention relates to an apparatus and a method for collecting data to be used for generating a map.

BACKGROUND

Highly accurate road maps to which an automated vehicle-driving system refers for automated driving control of a vehicle are required to accurately represent road information. Techniques have been proposed to appropriately collect information required to generate such accurate road maps (see, e.g., Japanese Unexamined Patent Publications Nos. 2007-58370 and 2017-117154).

For example, Japanese Unexamined Patent Publication No. 2007-58370 discloses a technique in which each of vehicle-mounted devices included in a road-map providing system transmits travel history information together with information on a travel purpose and an attribute to a road-map providing device. The road-map providing device statistically processes the travel history information for each received travel purpose and attribute, generates road-map information classified by travel purposes and attributes, and stores it in a database. Japanese Unexamined Patent Publication No. 2017-117154 discloses a technique in which a vehicle transmits, to a management center, image data of surroundings of the vehicle in association with the travel position and time of the vehicle at obtaining the data. The management center estimates the number of travelling vehicles for each road section registered with a map database, based on received travel positions and times of vehicles, and calculates, as a cover ratio, a ratio of the estimated number of travelling vehicles to a reference number of vehicles defined for each road section. The management center determines a condition for capturing images so that the lower the cover ratio, the shorter the interval between image captures, and delivers the determined condition to the vehicles.

SUMMARY

Since the amount of traffic differs among road sections, the above-described techniques may fail to collect in a predetermined period as many pieces of map-generating data of some road sections as required to generate or update a map.

It is an object of the present invention to provide an apparatus for collecting map-generating data that can predict the number of pieces of map-generating data to be collected in a predetermined period ahead for one of road sections for which the number of collected pieces of map-generating data has not reached a target number, the road sections being included in a target region for generating or updating a map.

According to an embodiment, an apparatus for collecting map-generating data is provided. The apparatus includes a communication circuit capable of communicating with at least one vehicle; a memory; and a processor configured to store, when receiving from any of the at least one vehicle via the communication circuit, map-generating data representing road environment around the vehicle together with information indicating a road section where the map-generating data is acquired, stores in the memory the map-generating data in association with the road section and a date and time of reception, count, for each of road sections, the number of pieces of map-generating data received in a first period, identify one of the road sections for which the number of pieces of map-generating data received in the first period does not reach a target number for the one of the road sections, and predict, for the identified road section, the number of pieces of map-generating data to be received in a second period ahead after the first period, based on history of traffic volume under each environmental condition or history of the number of pieces of map-generating data previously received for the road section.

In the apparatus, the processor is preferably further configured to instruct via the communication circuit a predetermined device to collect the map-generating data of the identified road section when the sum of the number of pieces of map-generating data received in the first period and the number of pieces of map-generating data predicted to be received in the second period for the road section does not reach the target number for the road section.

In this case, the processor preferably does not instruct the predetermined device to collect the map-generating data of the identified road section when the number of pieces of map-generating data received in the first period for the road section or the sum of the number of pieces of map-generating data received in the first period and the number of pieces of map-generating data predicted to be received in the second period for the road section reaches the target number for the road section.

The processor of the apparatus preferably determines a predicted value of traffic volume under each environmental condition for the identified road section, based on the history of traffic volume under each environmental condition, and predicts the number of pieces of map-generating data to be received in the second period, using a prediction model representing a relationship between the predicted value of traffic volume under each environmental condition and the number of pieces of map-generating data to be received.

Alternatively, the processor of the apparatus preferably determines a predicted value of traffic volume in the second period for the identified road section, based on the history of traffic volume under each environmental condition, and predicts the number of pieces of map-generating data to be received in the second period, using a prediction model representing a relationship between the predicted value of traffic volume and the number of pieces of map-generating data to be received.

According to another embodiment, a method for collecting map-generating data is provided. The method includes: storing, when receiving from any of at least one vehicle via a communication circuit capable of communicating with the at least one vehicle, map-generating data representing road environment around the vehicle together with information indicating a road section where the map-generating data is acquired, in a memory the map-generating data in association with the road section and a date and time of reception; and counting, for each of road sections, the number of pieces of map-generating data received in a first period. The method further includes: identifying one of the road sections for which the number of pieces of map-generating data received in the first period does not reach a target number for the one of the road sections; and predicting, for the identified road section, the number of pieces of map-generating data to be received in a second period ahead after the first period, based on history of traffic volume under each environmental condition or history of the number of pieces of map-generating data previously received for the road section.

The apparatus according to the present invention has an advantageous effect of being able to predict the number of pieces of map-generating data to be collected in a predetermined period ahead for one of road sections for which the number of collected pieces of map-generating data has not reached a target number, the road sections being included in a target region for generating or updating a map.

DESCRIPTION OF EMBODIMENTS

Hereinafter, an apparatus for collecting map-generating data and a method therefor executed by the apparatus will be described with reference to the accompanying drawings. For each of road sections included in a target region for generating or updating a map, the apparatus collects data representing road environment of the road section and used for generating or updating a map (hereafter, "map-generating data") from at least one vehicle capable of communication. The apparatus counts, for each of the road sections, the number of pieces of map-generating data collected in a preceding predetermined period (hereafter, a "first period"), and identifies one of the road sections for which the number of collected pieces of map-generating data does not reach a target number. For the identified road section, the apparatus predicts the number of pieces of map-generating data to be collected in a predetermined period ahead (hereafter, a "second period"), based on that predicted value of traffic volume under each environmental condition for the road section which is predicted from history of traffic volume under each environmental condition or on history of the number of pieces of map-generating data collected previous to the first period for the road section. Additionally, the apparatus instructs a predetermined device to collect map-generating data of a road section for which the sum of the number of pieces of map-generating data collected in the first period and the number of pieces of map-generating data predicted to be collected in the second period does not reach the target number. In this way, the apparatus can predict the number of pieces of map-generating data to be collected in a predetermined period ahead for a road section for which the number of collected pieces of map-generating data has not reached the target number. In particular, the apparatus can facilitate collecting a target number of pieces of data of a road section for which not only the number of pieces of map-generating data collected so far but also the number of pieces of map-generating data predicted to be collected are small.

The map-generating data includes, for example, an image representing a road and generated by a camera mounted on a vehicle, or a sub-image obtained by cutting out a region representing a road surface from such an image. The map-generating data may further include data representing the kinds of road features in a map to be generated or updated (e.g., signposts or road markings, such as lane division lines or stop lines).

The individual road sections may be, for example, sections corresponding to individual links of nodes and links representing a road network in a road map for a navigation system. However, the individual road sections are not limited to this example, and may be sections obtained by dividing individual roads in a target region for generating or updating a map into units of predetermined lengths (e.g., 100 m to 1 km).

Figure 1:
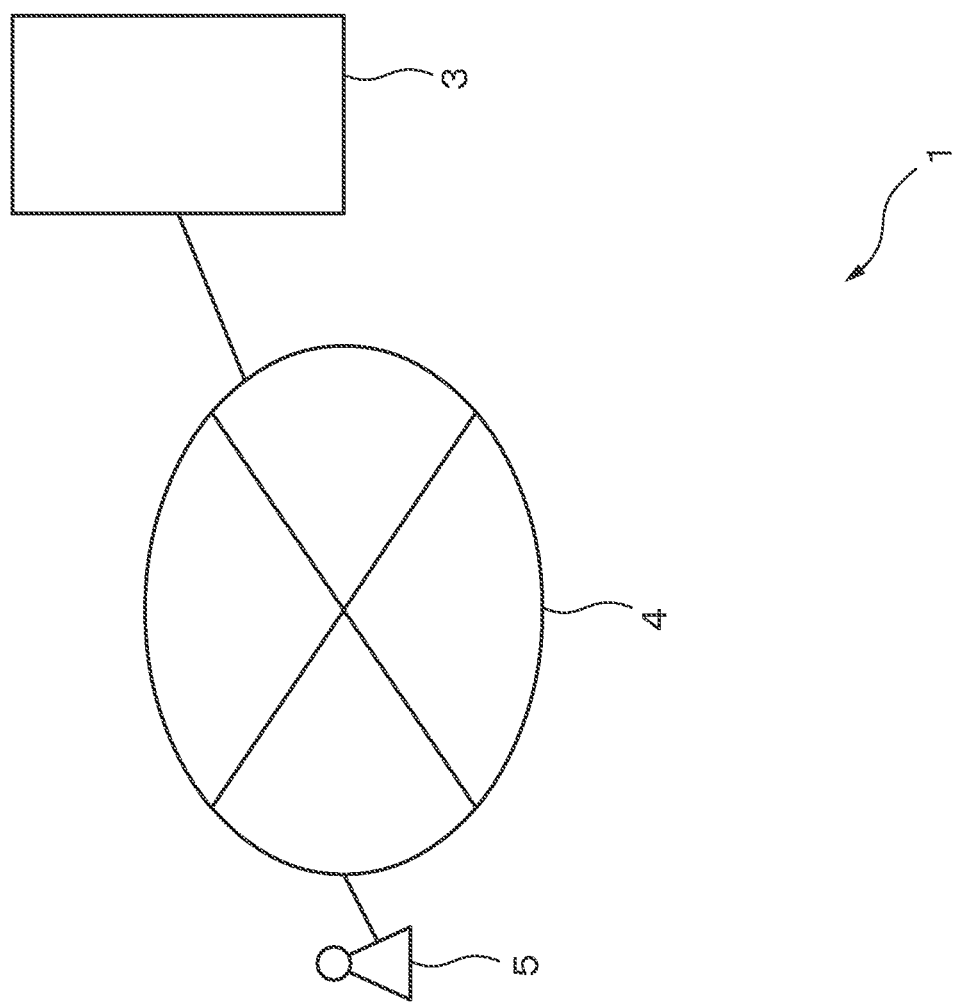
FIG. 1 schematically illustrates the configuration of a system for collecting map-generating data that includes an apparatus for collecting map-generating data.

FIG. 1 schematically illustrates the configuration of a system for collecting map-generating data that includes the apparatus for collecting map-generating data. In the present embodiment, the system 1 includes at least one vehicle 2 and a server 3, which is an example of the apparatus for collecting map-generating data. The vehicle 2 accesses a wireless base station 5, which is connected, for example, via a gateway (not illustrated) to a communication network 4 connected with the server 3, thereby connecting to the server 3 via the wireless base station 5 and the communication network 4. Although FIG. 1 illustrates only one vehicle 2, the system 1 may include multiple vehicles 2. Similarly, the communication network 4 may be connected with multiple wireless base stations 5.

Figure 2:
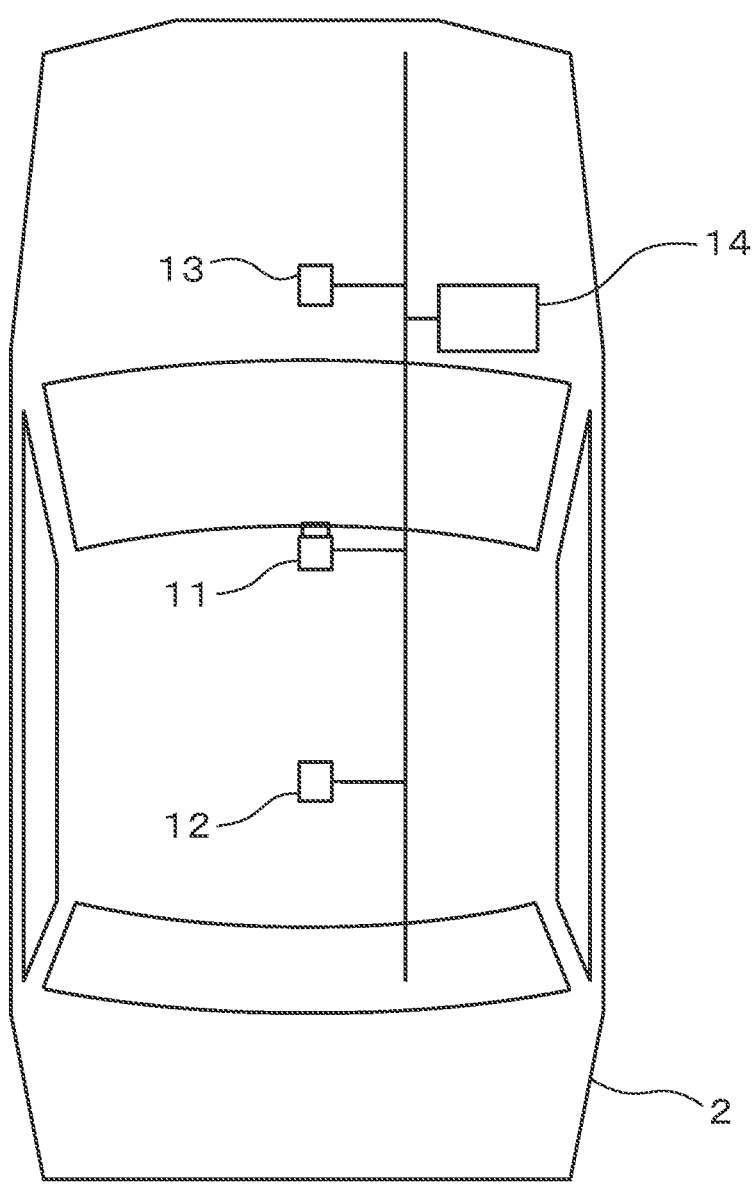
FIG. 2 schematically illustrates the configuration of a vehicle.

FIG. 2 schematically illustrates the configuration of the vehicle 2. The vehicle 2 includes a camera 11 for capturing surroundings of the vehicle 2, a GPS receiver 12, a wireless communication terminal 13, and a data acquiring device 14. The camera 11, the GPS receiver 12, the wireless communication terminal 13, and the data acquiring device 14 are connected so that they can communicate via an in-vehicle network conforming to a standard, such as a controller area network. The vehicle 2 may further include a navigation device (not illustrated) for searching for a planned travel route of the vehicle 2 and for navigating so that the vehicle 2 may travel along the planned travel route.

The camera 11, which is an example of an image capturing unit, includes a two-dimensional detector constructed from an array of optoelectronic transducers, such as CCD or C-MOS, having sensitivity to visible light and a focusing optical system focusing an image of a target region on the two-dimensional detector. The camera 11 is mounted, for example, in the interior of the vehicle 2 so as to be oriented, for example, to the front of the vehicle 2. The camera 11 captures a region in front of the vehicle 2 every predetermined capturing period (e.g., 1/30 to 1/10 seconds), and generates images of this region. The images obtained by the camera 11 may be color or gray images. The vehicle 2 may include multiple cameras 11 taking pictures in different orientations or having different focal lengths.

Every time generating an image, the camera 11 outputs the generated image to the data acquiring device 14 via the in-vehicle network.

The GPS receiver 12 receives a GPS signal from a GPS satellite every predetermined period, and determines the position of the vehicle 2, based on the received GPS signal. The GPS receiver 12 then outputs positioning information indicating the result of determination of the position of the vehicle 2 based on the GPS signal to the data acquiring device 14 via the in-vehicle network every predetermined period. The vehicle 2 may include a receiver conforming to another satellite positioning system other than the GPS receiver 12. In this case, the receiver may determine the position of the vehicle 2.

The wireless communication terminal 13, which is an example of a communication unit, is a device to execute a wireless communication process conforming to a predetermined standard of wireless communication, and accesses, for example, the wireless base station 5 to connect to the server 3 via the wireless base station 5 and the communication network 4. The wireless communication terminal 13 generates an uplink radio signal including data received from the data acquiring device 14, such as map-generating data and positional information indicating the position of a location or a road feature represented in the map-generating data. The wireless communication terminal 13 transmits the uplink radio signal to the wireless base station 5 to transmit the map-generating data, the positional information, and other data to the server 3. Additionally, the wireless communication terminal 13 receives a downlink radio signal from the wireless base station 5, and passes various kinds of information from the server 3 included in the radio signal to the data acquiring device 14 or an electronic control unit (ECU) (not illustrated) that controls travel of the vehicle 2.

Figure 3:
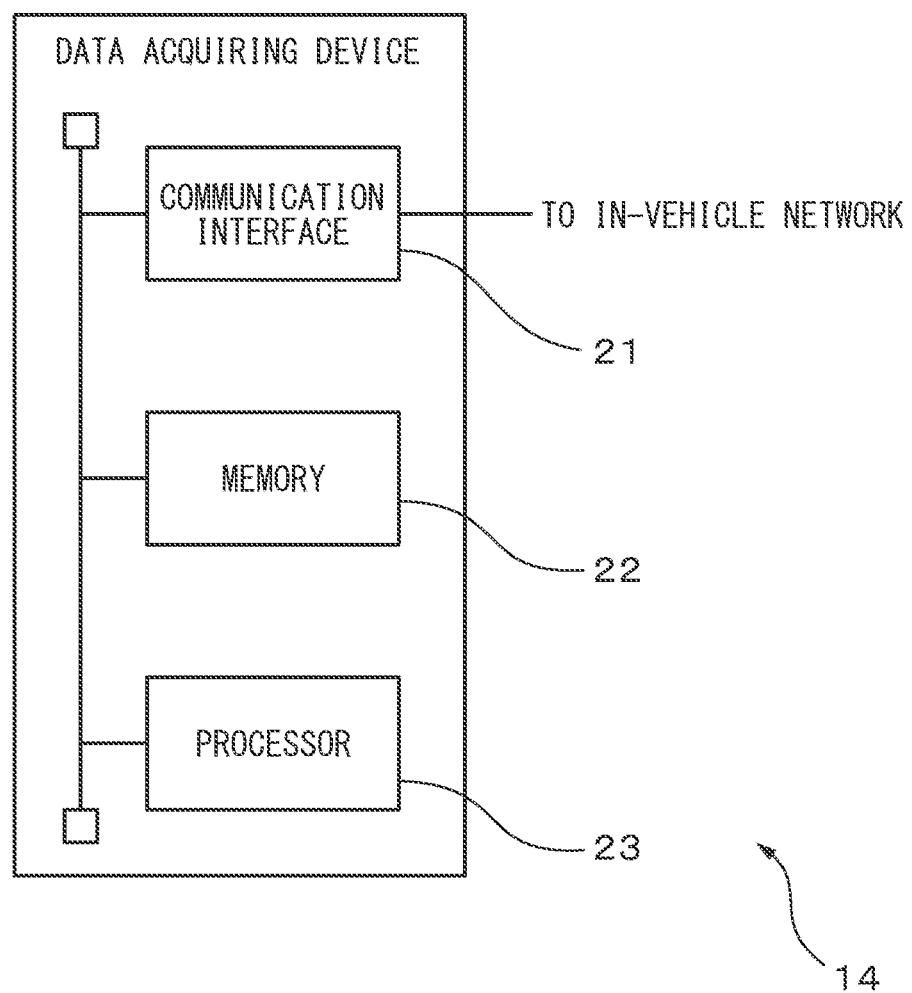
FIG. 3 illustrates the hardware configuration of a data acquiring device.

FIG. 3 illustrates the hardware configuration of the data acquiring device. The data acquiring device 14 generates map-generating data and positional information, based on images generated by the camera 11. The positional information is an example of information indicating a road section where map-generating data is acquired. To achieve its functions, the data acquiring device 14 includes a communication interface 21, a memory 22, and a processor 23.

The communication interface 21, which is an example of an in-vehicle communication unit, includes an interface circuit for connecting the data acquiring device 14 to the in-vehicle network. In other words, the communication interface 21 is connected to the camera 11, the GPS receiver 12, and the wireless communication terminal 13 via the in-vehicle network. Every time receiving an image from the camera 11, the communication interface 21 passes the received image to the processor 23. Every time receiving positioning information from the GPS receiver 12, the communication interface 21 passes the received positioning information to the processor 23. Additionally, the communication interface 21 outputs data received from the processor 23, such as map-generating data and positional information, to the wireless communication terminal 13 via the in-vehicle network.

The memory 22, which is an example of a storage unit, includes, for example, volatile and nonvolatile semiconductor memories. The memory 22 may further include other storage, such as a hard disk drive. The memory 22 stores various kinds of data used in a process related to collection of map-generating data executed by the processor 23 of the data acquiring device 14. Such data includes, for example, identification information of the vehicle 2, internal parameters of the camera 11, a set of parameters for specifying a classifier for detecting a road feature from an image, road maps for the navigation system used for identifying individual road sections, images received from the camera 11, and positioning information received from the GPS receiver 12. The memory 22 may further store computer programs for various processes executed on the processor 23.

The processor 23 includes one or more central processing units (CPUs) and a peripheral circuit thereof. The processor 23 may further include another operating circuit, such as a logic-arithmetic unit, an arithmetic unit, or a graphics processing unit. The processor 23 stores images received from the camera 11 and positioning information received from the GPS receiver 12 in the memory 22. Additionally, the processor 23 executes a process related to collection of map-generating data during travel of the vehicle 2 to generate map-generating data and positional information every predetermined period (e.g., 0.1 to 10 seconds).

For example, the processor 23 generates map-generating data every predetermined period, based on an image received from the camera 11. For example, the processor 23 uses an image itself received from the camera 11 (hereafter, a "whole image") as the map-generating data. Alternatively, the processor 23 cuts out a sub-image including a region representing a road surface from a whole image received from the camera 11, and uses the cut-out sub-image as the map-generating data. Information indicating a region supposed to represent a road surface in a whole image may be prestored in the memory 22. The processor 23 may refer to this information to identify the region to be cut out from a whole image.

Alternatively, the processor 23 may input a whole image or a sub-image into a classifier to detect a road feature represented in the inputted whole image or sub-image (hereafter simply the "input image"), and generate information indicating the kind of the detected road feature as the map-generating data. As such a classifier, the processor 23 may use, for example, a deep neural network (DNN) that has been trained to detect, from an input image, a road feature represented in the image. As such a DNN, for example, a DNN having a convolutional neural network (CNN) architecture, such as a Single Shot MultiBox Detector (SSD) or a Faster R-CNN, is used. In this case, the classifier calculates, for each kind of road feature to be detected (e.g., a lane division line, a pedestrian crossing, and a stop line), a score indicating the probability that the road feature is represented in a region of the input image. The classifier calculates this score for each of various regions of the input image. The classifier determines that the region where the score for a certain kind of road feature is not less than a predetermined detection threshold represents this kind of road feature. The classifier then outputs information indicating a region including the road feature to be detected in the input image, e.g., a circumscribed rectangle of this road feature (hereafter, an "object region"), and information indicating the kind of road feature represented in the object region. The processor 23 may generate map-generating data so as to include the information indicating the kind of road feature represented in the detected object region.

Additionally, the processor 23 generates positional information indicating the real-space position of a location or a road feature represented in map-generating data. For example, the processor 23 determines that the position of the vehicle 2 at reception of an image used for generating map-generating data is the position of the location represented in the map-generating data. To this end, the processor 23 may determine that the position indicated by the positioning information received from the GPS receiver 12 at the timing closest to the reception of the image used for generating the map-generating data is the position of the vehicle 2. Alternatively, when the ECU (not illustrated) estimates the position of the vehicle 2, the processor 23 may acquire information indicating the estimated position of the vehicle 2 from the ECU via the communication interface 21. Alternatively, when the map-generating data is a whole image or a sub-image, the processor 23 may estimate the real-space position corresponding to the center of the whole image or the sub-image as the position of the location represented in the map-generating data. In this case, the processor 23 may estimate the position of the location corresponding to the center of the whole image or the sub-image, based on the bearing with respect to the camera 11, the position and the travel direction of the vehicle 2, and the internal parameters of the camera 11, such as its orientation and angle of view. Alternatively, when the map-generating data includes information indicating the kind of road feature detected from an image, the processor 23 estimates the position of the road feature represented in an object region detected from the image, based on the bearing of the position corresponding to the centroid of the object region with respect to the camera 11, the position and the travel direction of the vehicle 2, and the internal parameters of the camera 11, such as its orientation and angle of view.

The processor 23 refers to a road map to identify a link that is a road section including the position of a location or a road feature represented in the map-generating data or being the closest to this position. The processor 23 then includes, in the positional information, an identification number of the identified link as information indicating the position of a location or a road feature represented in the map-generating data. Alternatively, the processor 23 may include, in the positional information, the latitude and longitude indicating the position of a location or a road feature represented in the map-generating data as information indicating the position of a location or a road feature represented in the map-generating data. As described above, the positional information includes information indicating the position of a location or a road feature represented in the map-generating data, and this position is in or near one of road sections. Therefore the positional information indicates the road section where the map-generating data is acquired.

The processor 23 may generate two or more kinds of map-generating data selected from among a whole image, a sub-image, and information indicating the kind of road feature. The processor 23 may change the kind of map-generating data to be generated, depending on the position of the vehicle 2 at generating the map-generating data. In this case, the data acquiring device 14 receives in advance type-specifying information for specifying the kind of map-generating data to be collected for each district or each road section from the server 3 via the wireless base station 5, and stores it in the memory 22. The processor 23 may refer to the type-specifying information to identify the kind of map-generating data to be generated. When the position of the vehicle 2 is included in a district or a road section for which the type-specifying information specifies that map-generating data is not collected, the processor 23 need not generate map-generating data. Alternatively, the kind of map-generating data to be generated may be changed depending on road environment around the vehicle 2. For example, the processor 23 may select, as map-generating data, a whole image when the vehicle 2 is within a predetermined area of an intersection, and a sub-image or information indicating the kind of road feature when the vehicle 2 is outside this predetermined area. In this case, the processor 23 may refer to the position of the vehicle 2 and a road map stored in the memory 22 to determine whether the vehicle 2 is within a predetermined area of an intersection.

Every time generating map-generating data and positional information, the processor 23 outputs the generated map-generating data and positional information to the wireless communication terminal 13 via the communication interface 21. In this way, the map-generating data and the positional information is transmitted to the server 3.

Figure 4:
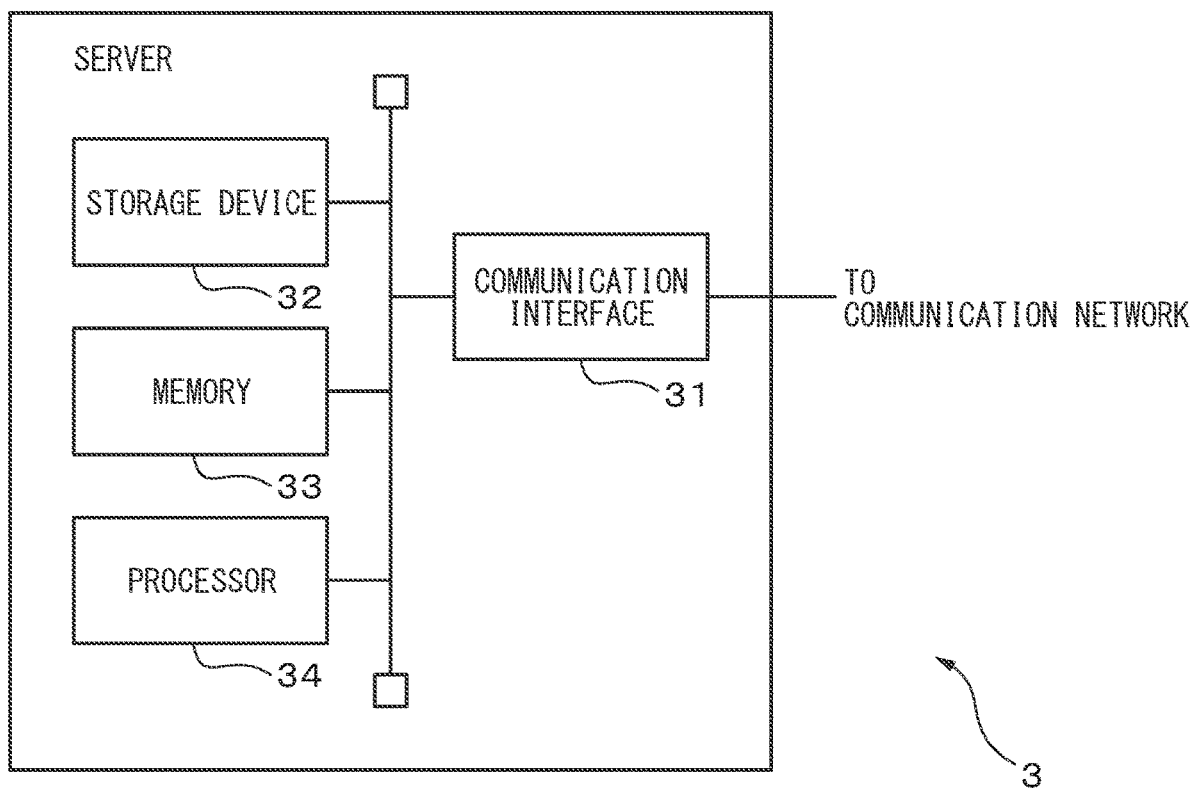
FIG. 4 illustrates the hardware configuration of a server, which is an example of the apparatus for collecting map-generating data.

The following describes the server 3, which is an example of the apparatus for collecting map-generating data. FIG. 4 illustrates the hardware configuration of the server 3, which is an example of the apparatus for collecting map-generating data. The server 3 includes a communication interface 31, a storage device 32, a memory 33, and a processor 34. The communication interface 31, the storage device 32, and the memory 33 are connected to the processor 34 via a signal line. The server 3 may further include an input device, such as a keyboard and a mouse, and a display device, such as a liquid crystal display.

The communication interface 31, which is an example of the communication unit, includes an interface circuit for connecting the server 3 to the communication network 4. The communication interface 31 is configured so that it can communicate with the vehicle 2 via the communication network 4 and the wireless base station 5. More specifically, the communication interface 31 passes map-generating data, positional information, and other data, which are received from the vehicle 2 via the wireless base station 5 and the communication network 4, to the processor 34. The communication interface 31 transmits, for example, a notification signal including the type-specifying information received from the processor 34 to the vehicle 2 via the communication network 4 and the wireless base station 5. Additionally, the communication interface 31 receives information indicating traffic volume for each road section included in a target region for generating or updating a map via the communication network 4 from another server (not illustrated) that manages traffic volume, and passes the information to the processor 34. The information indicates traffic volume for each day of the week, each type of weather, each temperature, each season, each place, or each type of road.

The storage device 32, which is an example of the storage unit, includes, for example, a hard disk drive, or an optical recording medium and an access device therefor. The storage device 32 stores various kinds of data and information used in a process for collecting map-generating data. For example, the storage device 32 stores target numbers for respective road sections included in a target region for generating or updating a map. For each of the road sections included in the target region for generating or updating a map, the storage device 32 further stores collected pieces of map-generating data, the date and time of acquisition and positional information of each piece of map-generating data, and the number of collected pieces of map-generating data. In other words, the storage device 32 stores history of the number of pieces of map-generating data previously received for each road section. Additionally, for the target region for generating or updating a map, the storage device 32 stores information indicating history of traffic volume under each environmental condition (e.g., information indicating traffic volume for each day of the week, each type of weather, each temperature, each season, each place, or each type of road). The storage device 32 may further store the type-specifying information and an address to which a signal is transmitted to instruct a predetermined device to collect map-generating data. The storage device 32 may further store road maps for the navigation system used for identifying individual road sections and a computer program executed on the processor 34 for executing the process for collecting map-generating data. The storage device 32 may further store a map to be generated or updated using the map-generating data.

The memory 33, which is another example of the storage unit, includes, for example, nonvolatile and volatile semiconductor memories. The memory 33 temporarily stores various kinds of data generated during execution of the process for collecting map-generating data, and various kinds of data acquired by communication with the vehicle 2.

The processor 34, which is an example of a control unit, includes one or more central processing units (CPUs) and a peripheral circuit thereof. The processor 34 may further include another operating circuit, such as a logic-arithmetic unit or an arithmetic unit. The processor 34 writes data received from another device via the communication network 4 in the storage device 32 or the memory 33, and executes the process for collecting map-generating data.

Figure 5:
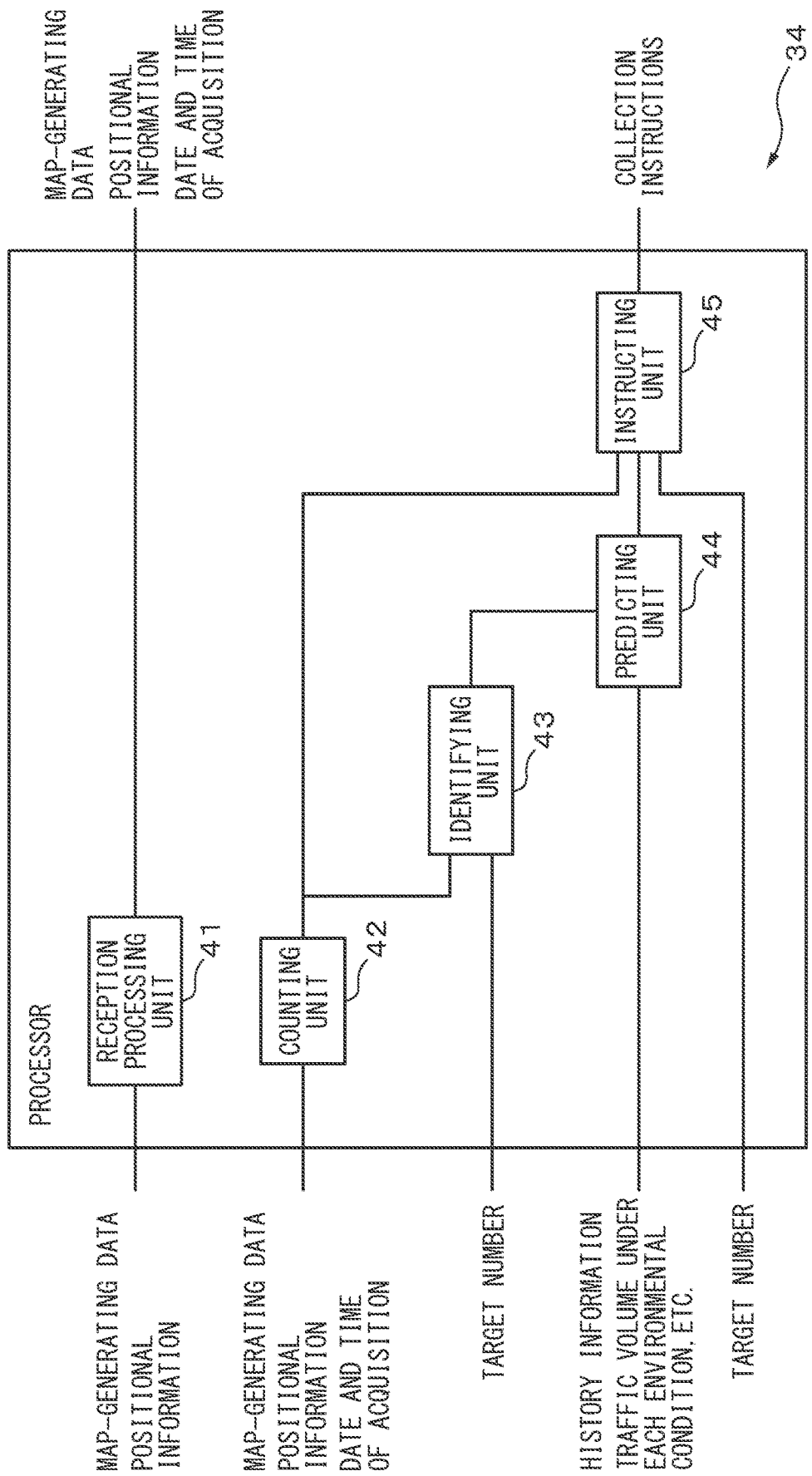
FIG. 5 is a functional block diagram of a processor of the server, related to a process for collecting map-generating data.

FIG. 5 is a functional block diagram of the processor 34, related to the process for collecting map-generating data. The processor 34 includes a reception processing unit 41, a counting unit 42, an identifying unit 43, a predicting unit 44, and an instructing unit 45. These units included in the processor 34 are, for example, functional modules implemented by a computer program executed on the processor 34, or may be dedicated operating circuits provided in the processor 34.

The reception processing unit 41 receives map-generating data and positional information from the vehicle 2 via the communication interface 31, and writes the received map-generating data and positional information in the storage device 32. The reception processing unit 41 also writes in the storage device 32 the date and time of reception of the map-generating data and the positional information (the date and time of acquisition) in association with the map-generating data. This allows for obtaining history of the number of pieces of map-generating data received in any past period for each road section, based on the map-generating data, positional information, and date and time of acquisition stored in the storage device 32.

The counting unit 42 counts the number of pieces of map-generating data received in a preceding predetermined period (first period) for each of the road sections. The first period may be, for example, one day to one month. The counting unit 42 refers to the date and time of acquisition of each piece of map-generating data stored in the storage device 32 to select pieces of map-generating data included in the first period. The counting unit 42 then refers to the positional information of the selected pieces of map-generating data to identify, for each road section, pieces of map-generating data of the position corresponding to the road section, and counts the number of identified pieces of map-generating data for each road section. When the positional information includes an identification number of the road section, the counting unit 42 may identify pieces of map-generating data of the position corresponding to each road section, based on this identification number. When the positional information includes the latitude and longitude of the position of a location or a road feature represented by the map-generating data, the counting unit 42 may refer to a road map to identify the road section located at the position of this latitude and longitude.

For each road section, the counting unit 42 notifies the identifying unit 43 and the instructing unit 45 of the number of pieces of map-generating data collected in the first period (this number may be referred to as the "actual number" below).

The identifying unit 43 identifies one or more of the road sections for which the actual number of pieces of map-generating data collected in the first period does not reach the target number for the road section. The target number may be set for each road section, or set at the same value for a target region for generating or updating a map. Alternatively, the target number may be set for each type of road (e.g., expressways, national roads, and city roads).

For each of the road sections, the identifying unit 43 loads the target number for the road section from the storage device 32, and compares the target number with the actual number of pieces of map-generating data collected for the road section. The identifying unit 43 then identifies one of the road sections for which the actual number is less than the target number as a road section for which the actual number of collected pieces of map-generating data does not reach the target number for the road section. The identifying unit 43 notifies the predicting unit 44 of identification numbers of the one or more identified road sections.

The predicting unit 44 calculates, for each of the one or more identified road sections, the number of pieces of map-generating data predicted to be received in a second period ahead after the first period (this number may be referred to as the "predicted number" below), based on history of the number of pieces of map-generating data previously received for the road section or history of traffic volume of the road section. The length of the second period may be equal to or different from that of the first period.

For example, the predicting unit 44 refers to the history of the number of previously received pieces of map-generating data to calculate, for each of the one or more identified road sections, the average of the numbers of pieces of map-generating data collected in a day in the first period for the road section, based on the length of the first period and the actual number of pieces of map-generating data collected for the road section. Then, for each of the one or more identified road sections, the predicting unit 44 multiplies the average of the numbers of pieces of map-generating data collected in a day for the road section by the length of the second period to calculate the predicted number of pieces of map-generating data to be collected for the road section.

Alternatively, the predicting unit 44 may refer to the history of the number of previously received pieces of map-generating data to count, for each of the one or more identified road sections, the number of pieces of map-generating data collected for the road section in the period in the previous year corresponding to the second period, and use the counted number as the predicted number of pieces of map-generating data to be collected for the road section. To this end, the predicting unit 44 can count the number of pieces of map-generating data collected in the period in the previous year corresponding to the second period through the same processing as is executed by the counting unit 42.

Alternatively, the predicting unit 44 may refer to the history of past traffic volume to calculate the predicted number of pieces of map-generating data to be collected for each of the one or more identified road sections. For example, the predicting unit 44 may calculate the predicted number of pieces of map-generating data to be collected for each of the one or more identified road sections, using a prediction model based on past traffic volume under each environmental condition. In this case, the predicting unit 44 loads from the storage device 32 information indicating traffic volume under each environmental condition, such as information indicating traffic volume for each day of the week, each type of weather, each temperature, each season, each place, or each type of road, and predicts the traffic volume under each environmental condition in the second period for the identified road section. Note that the predicted values of traffic volume under respective environmental conditions are typical predicted values of traffic volume corresponding to these environmental conditions, and that the sum of the predicted values of traffic volume under respective environmental conditions is not the predicted value of traffic volume of the identified road section in the second period.

For example, the predicting unit 44 determines the totals of traffic volume of respective days of the week included in the second period as predicted values of traffic volume related to days of the week and the traffic volume of the season including the second period as a predicted value of traffic volume related to seasons. The predicting unit 44 acquires information on predicted weather and predicted average temperature of the region including the identified road section via the communication network 4 and the communication interface 31 from another server that delivers weather information, and determines the traffic volume corresponding to this predicted weather as a predicted value of traffic volume related to weather and the traffic volume corresponding to this predicted average temperature as a predicted value of traffic volume related to temperatures. Additionally, the predicting unit 44 refers to the position and type of road of the identified road section, and determines the traffic volume of the place corresponding to the position of the identified road section as a predicted value of traffic volume related to places and the traffic volume of the type of road corresponding to the identified road section as a predicted value of traffic volume related to types of road.

After determining predicted values of traffic volume under respective environmental conditions, the predicting unit 44 calculates the predicted number of pieces of map-generating data to be collected for the identified road section, using, for example, a prediction model represented by a regression model like the following equation.

$$y = \sum_{i=1}^{M} w_i x_i \quad (1)$$

M is the number of environmental conditions for each of which predicted values of traffic volume are individually calculated; $x_i$ (i=1, 2, ..., M) is a predicted value of traffic volume under environmental condition i; $w_i$ (i=1, 2, ..., M) is a weight factor for environmental condition i; and y is a predicted number. Using such a prediction model to calculate the predicted number, the predicting unit 44 can correctly predict the number of pieces of map-generating data to be collected in the second period for the identified road section.

The predicting unit 44 notifies the instructing unit 45 of those predicted numbers of pieces of map-generating data to be collected which are determined for the one or more identified road sections, respectively.

The instructing unit 45 calculates, for each of the one or more identified road sections, the sum of the actual number of pieces of map-generating data collected in the first period and the predicted number of pieces of map-generating data to be collected in the second period, and compares the sum with the target number. For one of the identified road sections for which the sum does not reach the target number, the instructing unit 45 transmits an instruction signal to give instructions to collect map-generating data of this road section to a predetermined device via the communication interface 31 and the communication network 4. In this way, the server 3 can facilitate collecting a target number of pieces of map-generating data of a road section for which it is supposed that the number of collected pieces of map-generating data will not reach the target number even after the second period. The instructing unit 45 does not transmit an instruction signal for a road section for which the actual number of pieces of map-generating data collected in the first period or the sum of the actual number and the predicted number in the second period reaches the target number. This prevents unnecessary cost of data collection from being incurred.

The instruction signal includes, for example, information indicating a road section where map-generating data will be collected (e.g., an identification number of this road section) and information indicating the type of map-generating data to be collected. The instruction signal may further include information indicating the time limit for collecting map-generating data. The predetermined device may be, for example, a surveying vehicle (or an ECU mounted thereon) prepared for collecting map-generating data or a management device of a particular corporation that can make vehicles capable of generating map-generating data travel on identified road sections, such as a taxi company.

Figure 6:
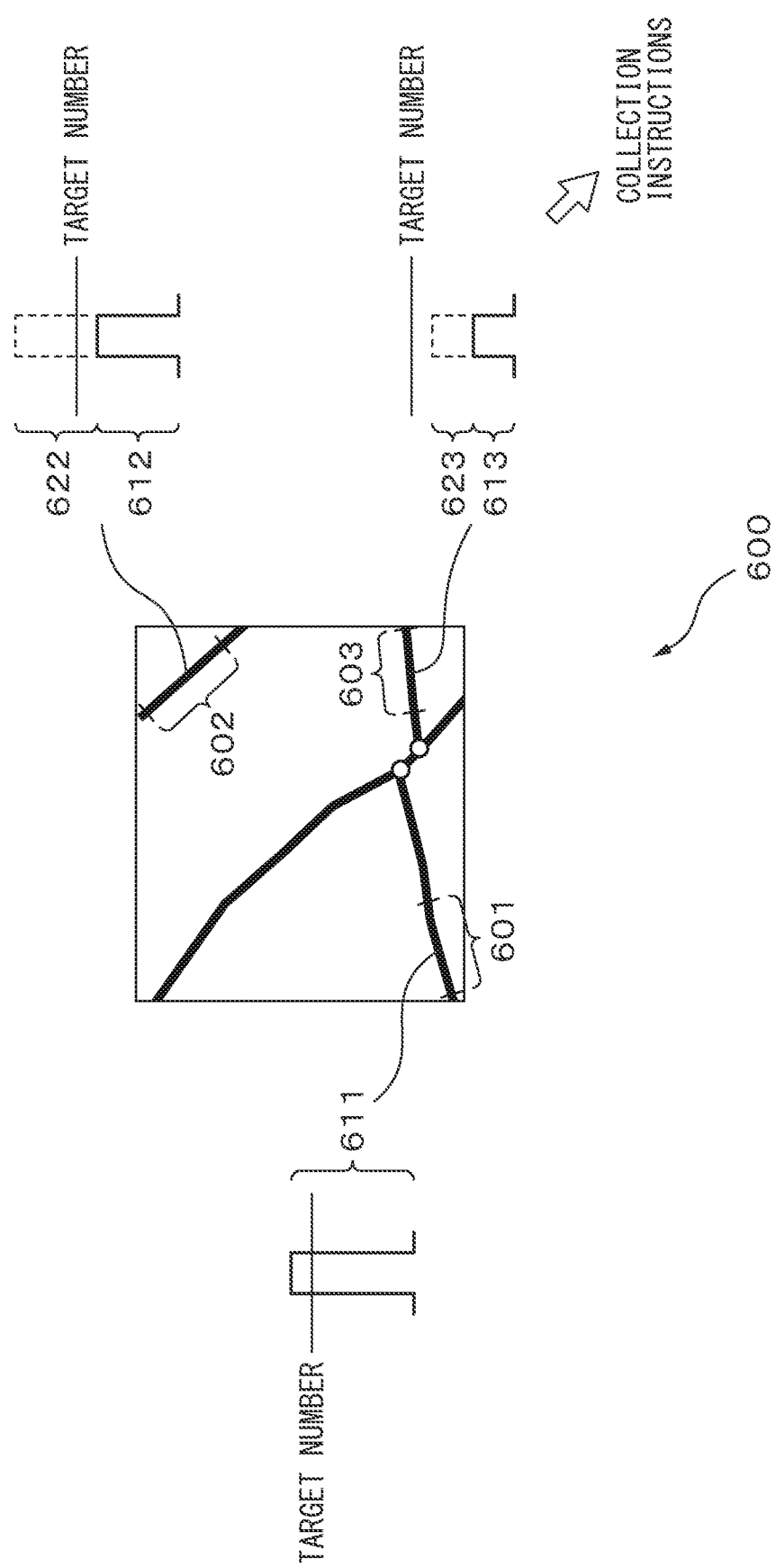
FIG. 6 is a diagram for explaining a target road section for prediction of the number of collected pieces and a target road section for collection instructions.

FIG. 6 is a diagram for explaining a target road section for prediction of the number of collected pieces and a target road section for collection instructions. Regarding a road section 601 in a region 600 illustrated in FIG. 6, the actual number 611 of pieces of map-generating data collected in the first period exceeds a target number. Hence, for the road section 601, the predicted number of pieces of map-generating data to be collected in the second period is not calculated, and a signal to give instructions to collect map-generating data is not transmitted. In contrast, regarding a road section 602, the actual number 612 of pieces of map-generating data collected in the first period does not reach the target number. Hence, for the road section 602, the predicted number 622 of pieces of map-generating data to be collected in the second period is calculated. Regarding the road section 602, the sum of the actual number 612 and the predicted number 622 exceeds the target number. Hence, for the road section 602, a signal to give instructions to collect map-generating data is not transmitted. Regarding a road section 603, the actual number 613 of pieces of map-generating data collected in the first period does not reach the target number. Hence, for the road section 603 also, the predicted number 623 of pieces of map-generating data to be collected in the second period is calculated. Regarding the road section 603, the sum of the actual number 613 and the predicted number 623 does not reach the target number. Hence, for the road section 603, a signal to give instructions to collect map-generating data is transmitted to a predetermined device.

Figure 7:
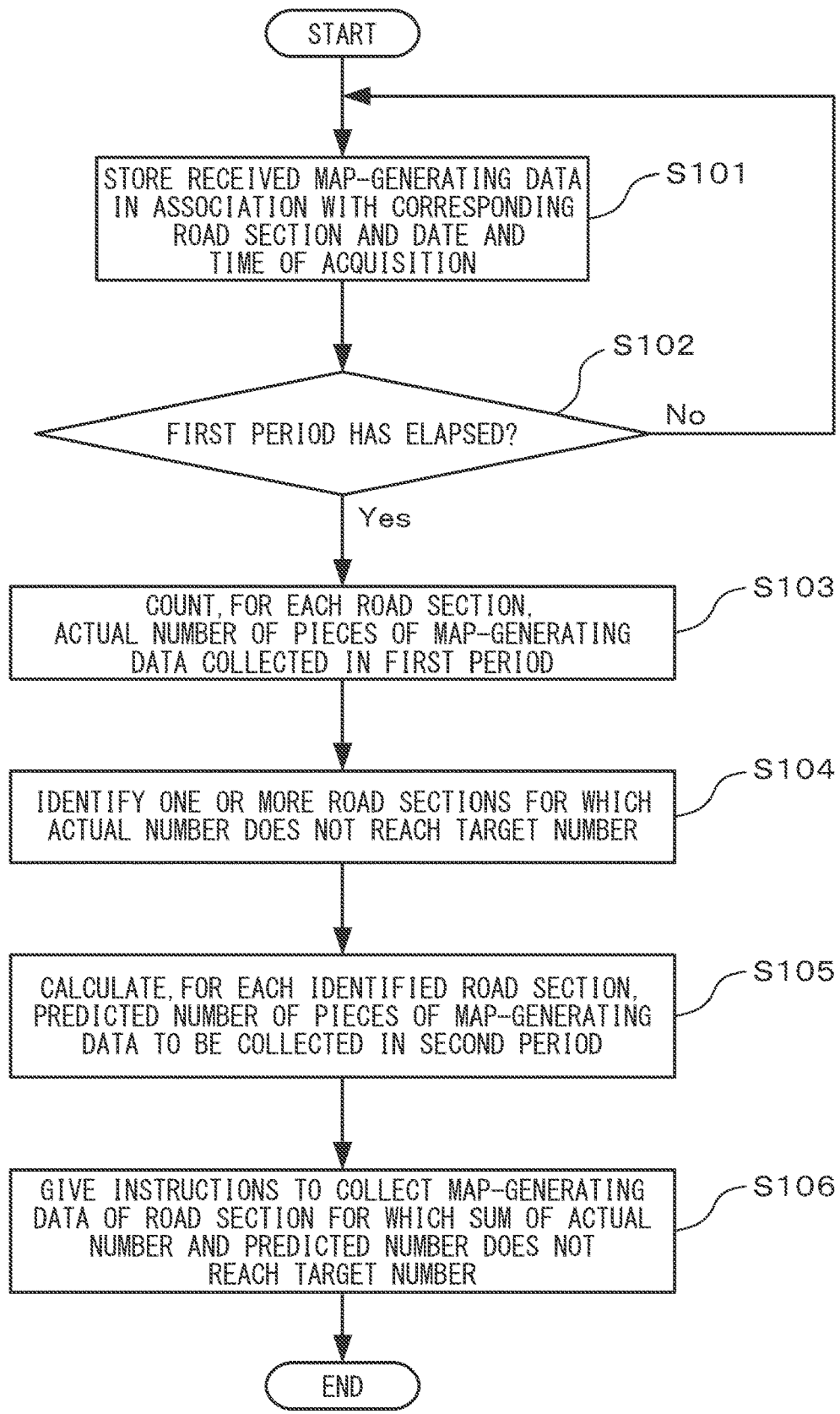
FIG. 7 is an operation flowchart of the process for collecting map-generating data.

FIG. 7 is an operation flowchart of the process for collecting map-generating data. The processor 34 of the server 3 may execute the process for collecting map-generating data in accordance with the following operation flowchart.

When receiving map-generating data and positional information from the vehicle 2 via the wireless base station 5 and the communication network 4, the reception processing unit 41 of the processor 34 stores in the storage device 32 the map-generating data in association with the road section indicated by the positional information and the date and time of reception (date and time of acquisition) (step S101). The counting unit 42 of the processor 34 determines whether the first period has elapsed (step S102). Unless the first period has elapsed (No in Step S102), the reception processing unit 41 repeats the processing of step S101.

After the elapse of the first period (Yes in Step S102), the counting unit 42 counts, for each road section, the actual number of pieces of map-generating data collected in the first period (step S103).

The identifying unit 43 of the processor 34 identifies one or more of the road sections for which the actual number does not reach the target number (step S104). The predicting unit 44 of the processor 34 calculates, for each of the one or more identified road sections, the predicted number of pieces of map-generating data to be collected in the second period ahead (step S105).

The instructing unit 45 of the processor 34 transmits, to a predetermined device via the communication network 4, a signal to give instructions to collect map-generating data of one of the one or more identified road sections for which the sum of the actual number in the first period and the predicted number in the second period does not reach the target number (step S106). After step S106, the processor 34 terminates the process for collecting map-generating data.

As has been described above, the apparatus for collecting map-generating data collects map-generating data for each of road sections included in a target region for generating or updating a map from at least one vehicle capable of communication. The apparatus counts, for each of the road sections, the actual number of pieces of map-generating data collected in a first period, and identifies one of the road sections for which the actual number does not reach a target number. For the identified road section, the apparatus calculates the predicted number of pieces of map-generating data to be collected in a second period ahead. For this reason, the apparatus can predict the number of pieces of map-generating data to be collected in the second period for a road section for which the number of collected pieces of map-generating data has not reached the target number. Additionally, the apparatus instructs a predetermined device to collect map-generating data of one or more of the identified road sections for which the sum of the actual number in the first period and the predicted number in the second period does not reach the target number. For this reason, the apparatus can facilitate collecting a target number of map-generating data of a road section for which the sum of the actual number in the first period and the predicted number in the second period does not reach the target number.

According to a modified example, the predicting unit 44 may obtain a predicted value of traffic volume in the second period, based on history of traffic volume under each environmental condition, for a road section for which it is determined that the actual number of pieces of map-generating data collected in the first period does not reach the target number. In this case, the server 3 receives the traffic volume under each combination of environmental conditions, e.g., the traffic volume for each combination of two or more of days of the week, types of weather, temperatures, seasons, places, and types of road, via the communication network 4 from another server (not illustrated) that manages traffic volume, and stores it in the storage device 32. Of the values of traffic volume under respective combinations of environmental conditions, the predicting unit 44 determines, for each day included in the second period, the traffic volume corresponding to the combination of the day of the week, season, predicted weather, and predicted average temperature corresponding to this day and the position and type of road of the identified road section as a predicted value of traffic volume of the identified road section of this day. The predicting unit 44 then determines the total of the predicted values of traffic volume of the identified road section of the respective days included in the second period as a predicted value of traffic volume of the identified road section in the second period. The predicting unit 44 then calculates the predicted number of pieces of map-generating data to be collected in the second period, using a prediction model representing the relationship between the predicted value of traffic volume of the identified road section in the second period and the predicted number of pieces of map-generating data to be received, i.e., the predicted number of pieces thereof to be collected. This prediction model is, for example, expressed as a function defining the relationship between the predicted value of traffic volume and the predicted number of pieces of map-generating data to be collected (e.g., a linear function or a polynomial such that the greater the predicted value of traffic volume, the greater the predicted number of pieces of map-generating data to be collected), and prestored in the memory 22. Thus, the predicting unit 44 may load such a prediction model from the memory 22, and use it to predict the number of pieces of map-generating data to be received in the second period.

According to this modified example, the predicting unit 44 can predict more correctly the number of pieces of map-generating data to be collected in the second period.

According to another modified example, the predicting unit 44 may calculate the predicted number of pieces of map-generating data to be collected in the second period for a road section for which the actual number of pieces of map-generating data collected in the first period reaches the target number.

A computer program for causing a computer to execute the functions of the units included in the processor of the apparatus according to the embodiment or modified examples may be provided in a form recorded on a computer-readable recording medium. The computer-readable recording medium may be, for example, a magnetic recording medium, an optical recording medium, or a semiconductor memory.

As described above, those skilled in the art may make various modifications according to embodiments within the scope of the present invention.

What is claimed is:

1. An apparatus for collecting map-generating data, comprising:
   a communication circuit capable of communicating with at least one vehicle;
   a memory; and
   a processor configured to: store, when receiving from any of the at least one vehicle via the communication circuit, map-generating data representing road environment around the vehicle together with information indicating a road section where the map-generating data is acquired, in the memory the map-generating data in association with the road section and a date and time of reception,
   count, for each of road sections, the number of pieces of map-generating data received in a first period,
   identify one of the road sections for which the number of pieces of map-generating data received in the first period does not reach a target number for the one of the road sections,
   predict, for the identified road section, the number of pieces of map-generating data to be received in a second period ahead after the first period, based on history of traffic volume under each environmental condition or history of the number of pieces of map-generating data previously received for the road section;
   instruct via the communication circuit a predetermined device to collect the map-generating data of the identified road section when the sum of the number of pieces of map-generating data received in the first period and the number of pieces of map-generating data predicted to be received in the second period for the road section does not reach the target number for the road section; and not instruct the predetermined device to collect the map-generating data of the identified road section when the number of pieces of map-generating data received in the first period for the road section or the sum of the number of pieces of map-generating data received in the first period and the number of pieces of map-generating data predicted to be received in the second period for the road section reaches the target number for the road section.

2. The apparatus according to claim 1, wherein the processor determines a predicted value of traffic volume under each environmental condition for the identified road section, based on the history of traffic volume under each environmental condition, and predicts the number of pieces of map-generating data to be received in the second period, using a prediction model representing a relationship between the predicted value of traffic volume under each environmental condition and the number of pieces of map-generating data to be received.

3. The apparatus according to claim 1, wherein the processor determines a predicted value of traffic volume in the second period for the identified road section, based on the history of traffic volume under each environmental condition, and predicts the number of pieces of map-generating data to be received in the second period, using a prediction model representing a relationship between the predicted value of traffic volume and the number of pieces of map-generating data to be received.

4. A method for collecting map-generating data, comprising:

storing, when receiving from any of at least one vehicle via a communication circuit capable of communicating with the at least one vehicle, map-generating data representing road environment around the vehicle together with information indicating a road section where the map-generating data is acquired, in a memory the map-generating data in association with the road section and a date and time of reception;

counting, for each of road sections, the number of pieces of map-generating data received in a first period;

identifying one of the road sections for which the number of pieces of map-generating data received in the first period does not reach a target number for the one of the road sections;

predicting, for the identified road section, the number of pieces of map-generating data to be received in a second period ahead after the first period, based on history of traffic volume under each environmental condition or history of the number of pieces of map-generating data previously received for the road section;

instructing via the communication circuit a predetermined device to collect the map-generating data of the identified road section when the sum of the number of pieces of map-generating data received in the first period and the number of pieces of map-generating data predicted to be received in the second period for the road section does not reach the target number for the road section; and not instructing the predetermined device to collect the map-generating data of the identified road section when the number of pieces of map-generating data received in the first period for the road section or the sum of the number of pieces of map-generating data received in the first period and the number of pieces of map-generating data predicted to be received in the second period for the road section reaches the target number for the road section.

* * * * *